US012135693B2

(12) United States Patent
Kumar et al.

(10) Patent No.: US 12,135,693 B2
(45) Date of Patent: Nov. 5, 2024

(54) CONSISTENCY MANAGEMENT OF COMPUTING OBJECTS OR FILES

(71) Applicant: SAP SE, Walldorf (DE)

(72) Inventors: Mukul Kumar, Bangalore (IN); Aalbert Niet, Bammental (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/080,516

(22) Filed: Dec. 13, 2022

(65) Prior Publication Data

US 2024/0193129 A1 Jun. 13, 2024

(51) Int. Cl.
 *G06F 7/00* (2006.01)
 *G06F 11/30* (2006.01)
 *G06F 16/176* (2019.01)
 *G06F 17/00* (2019.01)

(52) U.S. Cl.
 CPC ...... *G06F 16/1767* (2019.01); *G06F 11/3075* (2013.01)

(58) Field of Classification Search
 None
 See application file for complete search history.

(56) References Cited

U.S. PATENT DOCUMENTS

| | | | |
|---|---|---|---|
| 2010/0161460 A1* | 6/2010 | Vroom | G06Q 40/02 715/764 |
| 2017/0109818 A1* | 4/2017 | Amtrup | G06V 30/412 |
| 2018/0150913 A1* | 5/2018 | Wang | H04L 67/306 |
| 2018/0293648 A1* | 10/2018 | George | G06V 30/19173 |

* cited by examiner

*Primary Examiner* — Tuan A Pham
(74) *Attorney, Agent, or Firm* — Klarquist Sparkman, LLP

(57) ABSTRACT

Techniques and solutions are provided for checking two or more object instances or files for consistency. If an inconsistency is detected, remedial action can automatically be taken to resolve the inconsistency. For example, a check type to determine a particular type of consistency can be associated with a remedial action to be implemented if a check fails. The two or more object instances or files can represent data that is stored at a source system, sent to a target system, and where a version of the data sent to the target system is then received back by the source system and used for consistency checking. In particular implementations, object instances or files can be assigned a common identifier to facilitate their comparison.

20 Claims, 9 Drawing Sheets

600

| Consistency Type Name | Record Count | | Total Amount A | | Total Amount B | | Total Amount C | |
|---|---|---|---|---|---|---|---|---|
| | Document A | Document B | Document A | Document B | Document A | Document B | Document A | Document B |
| Complete Match | 23 | 24 | 1342.45 | 1340 | 8 | 8 | 123 | 123 |

| Validity Type | Source/Target EDocument Checks |
|---|---|
| Check Name | Source/Target EDocument Check |
| Check ID | 1234 |
| Document 1 Type | Source EDocument |
| Document 2 Type | Target EDocument |
| Check Method 1 | Existence |
| Result Type | No Target Document |

| Validity Type | Source/Target EDocument Checks |
|---|---|
| Check Name | Status Check |
| Check ID | 2463 |
| Document 1 Field | Source Edocument Status |
| Document 2 Field | Target Edocument Status |
| Check Method 2 | Status |
| Result Process | Src/Tgt Status Difference |

CONSISTENCY MANAGEMENT OF COMPUTING OBJECTS OR FILES

FIELD

The present disclosure relates to consistency checking of computing objects or files. Particular implementations provide a framework for performing consistency checks, including checking consistency between a data representation at a first system and a corresponding data representation at a second system.

BACKGROUND

Often, a particular entity requires the submission of data by other entities, such as to determine compliance with contractual terms, laws, or regulations. Negative consequences, such as fines or legal liability, can be incurred if the data is not provided in a timely and accurate way. As an example, consider that individuals and businesses are typically required to pay taxes to one or more authorities. Fines or other liability may result if tax documents are not submitted in a timely manner, if the documents are submitted but are not recorded by the submitting entity or the entity to whom the submission is made, or if the documents contain errors.

As a more particular example, a tax authority may periodically audit data submitted by an entity, such as by requesting documents used by the entity in preparing tax submissions. That is, in the case of taxes, entities are typically required to pay taxes and to provide data justifying the amount of tax paid. Thus, a tax authority may request documentation sufficient to enable it to determine whether the entities' calculations were correct, and the correct tax paid.

Typically, entities use their best efforts to comply with such legal or contractual obligations. However, errors can occur in preparing or transmitting data, or can occur when data is being ingested and processed by the party to whom the entity is obligated. The entity may not be aware of issues with a data submission until liability has been incurred, or at least is under investigation. For example, an entity can have different systems, and a system used to submit documents to another entity may be different than a system used to report or track compliance with legal requirements. Even after an issue has been identified, typically the issue is manually resolved, including identifying the issue, identifying how the issue should be resolved, and implementing the resolution. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for checking two or more object instances or files for consistency. If an inconsistency is detected, remedial action can automatically be taken to resolve the inconsistency. For example, a check type to determine a particular type of consistency can be associated with a remedial action to be implemented if a check fails. The two or more object instances or files can represent data that is stored at a source system, sent to a target system, and where a version of the data sent to the target system is then received back by the source system and used for consistency checking. In particular implementations, object instances or files can be assigned a common identifier to facilitate their comparison.

In one aspect, the present disclosure provides a process for determining an inconsistency between at least two objects or files, and automatically taking a remedial action to address the inconsistency. A first object instance or file having a first plurality of attributes and a respective first plurality of values for the first plurality of attributes is generated. The first object instance or file, or a second object instance or file derived at least in part therefrom, is sent to an external computing system, where the second object instance or file includes at least a portion of the first plurality of values. A third object instance or file is received from the external computing system, where the third object instance or file includes at least a portion of the first plurality of attributes and a second plurality of values corresponding to the at least a portion of the first plurality of attributes.

A consistency check specified for a fourth object instance or file is identified, where the fourth object instance or file is the first object instance or file, the second object instance or file, or the third object instance or file. Based at least in part on the consistency check, a fifth object instance or file to be compared with the fourth object instance or file is identified, where the fifth object instance or file is the first object instance or file, the second object instance or file, or the third object instance or file and is different than the fourth object instance or file.

The consistency check is executed to obtain consistency results. It is determined that a consistency result of the consistency results indicates an inconsistency.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 6 illustrates example consistency check results.

FIG. 7 illustrates an example consistency check definition and example consistency checks according to such definition.

DETAILED DESCRIPTION

Example 1—Overview

Figure 1:
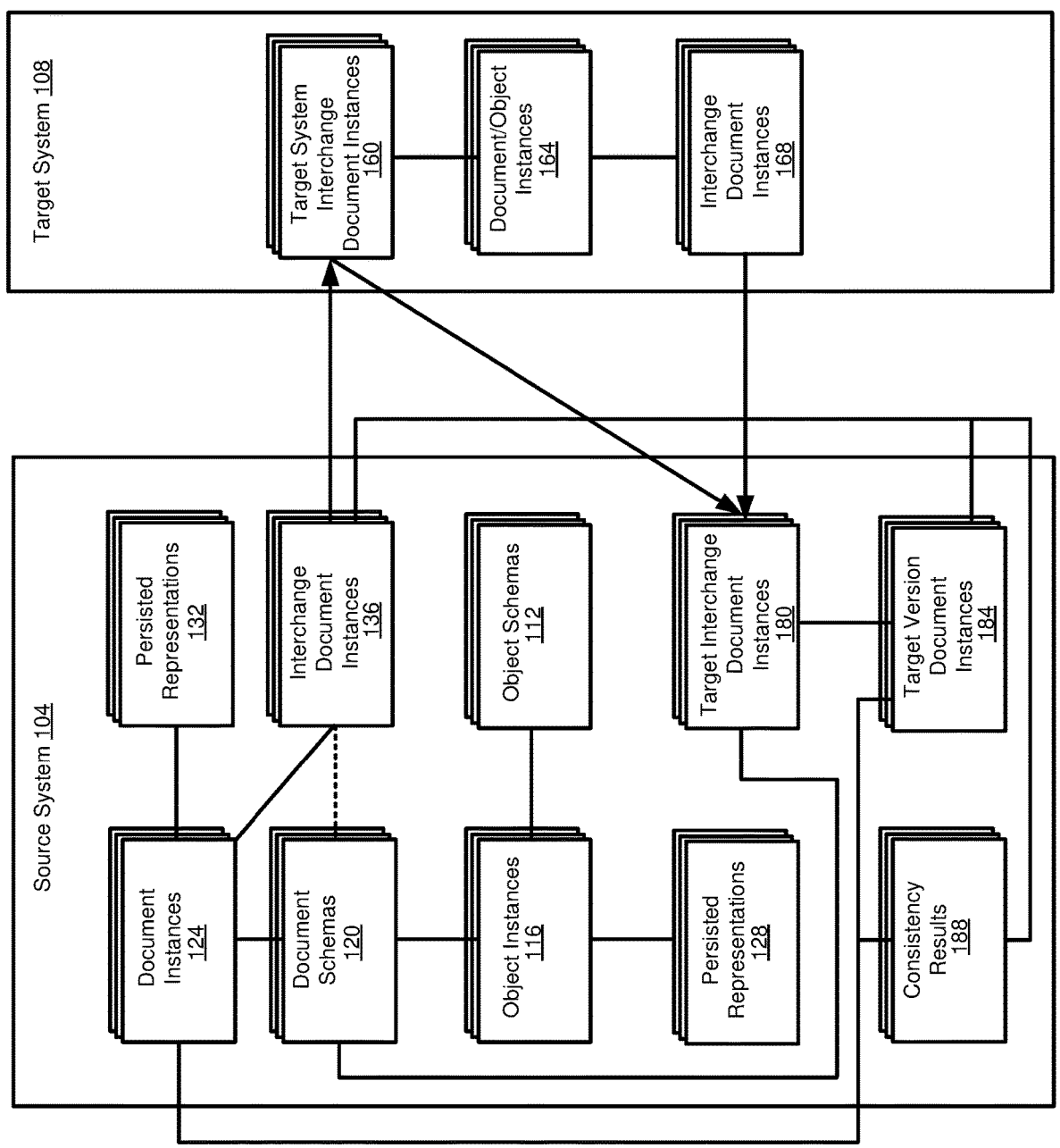
FIG. 1 is a block diagram of a computing environment having a source system and a target system, illustrating how an object can have various representations at such systems.

Often, a particular entity requires the submission of data by other entities, such as to determine compliance with contractual terms, laws, or regulations. Negative consequences, such as fines or legal liability, can be incurred if the data is not provided in a timely and accurate way. As an example, consider that individuals and businesses are typically required to pay taxes to one or more authorities. Fines or other liability may result if tax documents are not submitted in a timely manner, if the documents are submitted but are not recorded by the submitting entity or the entity to whom the submission is made, or if the documents contain errors. Fines or other liability may result if tax documents are not submitted in a timely manner, or if the documents contain errors.

As a more particular example, a tax authority may periodically audit data submitted by an entity, such as by requesting documents used by the entity in preparing tax submissions. That is, in the case of taxes, entities are typically required to pay taxes and to provide data justifying the amount of tax paid. Thus, a tax authority may request documentation sufficient to enable it to determine whether the entities' calculations were correct, and whether the correct tax was paid.

Typically, entities use their best efforts to comply with such legal or contractual obligations. However, errors can occur in preparing or transmitting data, or can occur when data is being ingested and processed by the party to whom the entity is obligated. The entity may not be aware of issues with a data submission until liability has been incurred, or at least is under investigation. For example, an entity can have different systems, and a system used to submit documents (such as a website or portal of the entity to whom documents are submitted, including direct/manual entry of data) to another entity may be different than a system used to report or track compliance with legal requirements. Even after an issue has been identified, typically the issue is manually resolved, including identifying the issue, identifying how the issue should be resolved, and implementing the resolution. Accordingly, room for improvement exists.

Disclosed technologies help address the above issues by providing for consistency checking between various data collections (for example, in an object instance or file), such as various data collections at the entity or a data collection originally sent by the entity, but as reflected in records of a receiving party. That is, there can be inconsistencies in a source system of the entity prior to sending data to the receiving party. However, even if the data in the source system is consistent, the data held by the receiving party may have inconsistencies with the source system data.

As described, typically process not only require manual identification of problems/inconsistencies, or the development of custom processes, but also require manual resolution of problems/inconsistencies. Disclosed techniques provide for the definition of resolution action to be taken when a particular type of issue is identified, and can include automatic initiation of such resolution actions.

Data can be stored or maintained in different schemas or in different formats for particular purposes. Taking an example of sales by a business, the business may have information about an order placed by a customer. As part of fulfilling the order, the business may generate an invoice. The transaction may be associated with the payment of taxes or other fees to a government agency, which is an example of a receiving party. Information about taxes to be paid by an entity can be associated with data stored in various data objects. The format in which an entity stores and works with data often is not the same as a format required by a receiving party, such as a taxation department. So, the business may generate data formatted as required by the taxation authority, and then transmit the data. Further, for at least some kinds of data, including tax data, data can be provided for individual transactions, or can be aggregated for multiple transactions (for example, where taxes are submitted for all transactions within a month, quarter, or year). Again, however, the entity may be required to maintain data sufficient to support the aggregated values.

In some cases, the receiving party stores data in the format provided by the sending party. However, often the data will get processed for entry into data systems of the receiving party. The entry process can result in the creation of new data, or at least a new representation of received data. It can be desirable to check whether the version of the data maintained by the receiving party matches the version sent by the entity, or that the data representations created by the receiving party are consistent with the data maintained by the entity. It can also be desirable to determine if different documents, corresponding to different representations of a common object, within a single system are internally consistent.

According, in at least some aspects of the present disclosure, data is retrieved from the receiving party by the entity, and is checked against data of the entity for consistency. The data from the receiving party can have the same content and format as originally submitted by the entity, or can differ in one or both of content or format (where a difference in format, including a difference in data type or an attribute name used to describe content, can complicate efforts to determine whether content/values are the same).

"Consistency" with respect to data, optionally including as collections of data (generally referred to as "documents"), such as in instances of abstract or composite data types (generally, "object instances" of a particular object type) or in a file, can refer to consistency of one or more aspects of a document. In particular, "consistency" can refer to whether expected representations of a document exist, which can be different representations in a common system, different representations in different systems, or a same representation in different systems.

Consistency can also refer to either the values or semantic meaning of two documents. For example, for a purchase arrangement, a buyer and seller may use different terminology, or values, to indicate whether an invoice has been paid. Even though there may be a difference in the values of the two documents, the documents can be considered semantically equal if they both convey the same result—that the invoice is paid. The same result may be obtained if one party shows a negative balance resulting from payment of the invoice and the other party shows a positive balance from receiving the payment. As for values, in some cases some variation in values between two documents may be tolerable. So, checking the consistency of values can including determining whether two values are the same, or if a difference between the values is within acceptable limits.

In some cases, a document can have an overall status. The invoice example above illustrates how a document can have a status. Assuming the document is the invoice, the document can be in a "paid" or "closed" state or an "unpaid" or "open" state. Assuming two entities both have a document representing the invoice, at least for the moment ignoring other measures of consistency, the invoice documents can be considered consistent if they both have the same document status—paid or unpaid.

Disclosed innovations include a framework for consistency checking of documents. For example, a framework can allow checks to be defined and implemented for various types of documents.

Example 2—Example Documents as Object Representations and Source and Target Systems FIG. 1 illustrates a computing environment 100 having a source system 104 and a target system 108. In some cases, a given system can serve as either a source or a target, or as both a source and a target. That is, whether a given system is a source or target can depend on a specific interaction between one system and one or more other systems. More generally, two systems in a relationship can simply be a first system and a second system.

Aspects of the present disclosure are described with respect to a scenario that involves an entity, such as a company, submitting documents to a legal authority, such as a regulatory authority or a tax authority. This scenario is used to help provide an understanding of disclosed innovations and how they can be implemented and used, but, unless otherwise specified, disclosed innovations are not restricted to this scenario.

In the scenario, various documents are generated at the source system 104. At least one document is sent from the source system 104 to the target system 108. The document received by the target system 108, or a document produced at least in part therefrom, can then be sent to, either by a push or pull mechanism, the source system 104, where it can be compared with documents of the source system.

Documents can reflect data of an "object." As used herein, an "object" refers to a collection of semantically related data. Typically, an object is an instance of an object type, where a set of attributes is defined for an object type, and values of the attributes are specific to specific instances of the object type. An object, in some cases, can be an abstract or composite data type, such as a class.

In another example, semantically related data can be stored in one or more relational database tables. For instance, an invoice can be stored as sales related data, as accounting related data, as data sent electronically, and afterwards as data obtained from the tax authorities. Similarly, a delivery note can be stored as sales related data, as a transport related electronic document, and as data sent, and afterwards obtained from, the tax authorities.

If the data for an object is stored in multiple tables, various attributes (including those serving as keys) can be used to link the multiple tables together so that the overall set of data for an object instance can be identified, retrieved, or modified. In the case of one or more database tables being used to represent an object, the various tables can have schemas that are used to define properties/attributes of the object. For example, a table can have columns forming attributes of an object type, and individual rows in the table can represent instances of the object type.

An object can be the basis of one or more documents. A given document can vary in what data of the object it includes, how the data is formatted, and whether/what additional data is included in the document. Some documents may be used by software applications (such as of the source system 104). Other documents can be document types that are specifically created to be exported, such as to the target system 108. Similarly, the target system 108 can have a version of the object/document received from the source system 104, or other documents, such as application documents, created at the target system. All of these documents have data related to the same object, and so can be considered to be different representations of the object. At least a portion of the documents can be considered as being in one or more sets, where a given set can be checked for consistency.

FIG. 1 illustrates the source system 104 as having a plurality of object schemas 112. The object schemas 112 can, for example, be class definitions, or computing constructs similar to class definitions. In another example, the object schemas 112 can be schemas for relational database tables or another storage format (for example a definition of a table or view stored in a data dictionary or information schema of a relational database system).

Object instances 116 can be created from, or based on, the object schemas 112. Typically, multiple object instances 116 can be created from, or based on, the same object schema. A given object instance 116 typically has at least some data that is different than another object instance. At the least, a given object instance 116 typically has an identifier that is different than identifiers of other object instances.

As discussed, data in object instances 116 can be included in one or more document instances 124. A document instance 124 can also be based on a particular document schema 120. However, not at all documents need to be an instance 124 of a document schema 120. That is, a user or computing process can create custom documents that include particular data from an object instance 116. However, disclosed techniques relate to determining consistency between documents, and so typically documents used in disclosed techniques will be of a defined type, such as reflected by a particular document schema 120.

At least some object instances 116 or document instances 124 are runtime constructs used by computing processes. It typically is desired to store persisted representations 128 of object instances or persisted representations 132 of document instances 124. The persisted representations 128, 132 can be used for a variety of purposes, such as for creating (or re-creating) a respective instance 116, 124, which can be upon user or process request, or in response to a restart event. Persisted representations 128, 132 are not limited to any particular format. Examples of formats useable for persisted representations 128, 132 include persisted relational database tables or JSON or XML documents.

While the documents and objects of the source system 104 can serve a variety of useful purposes at the source system, disclosed technologies relate to the transfer of information from the source system 104 to the target system 108. Typically, the target system 108 is configured to receive data in a certain format, or document schema. This format may be a format specified by an entity operating the target system 108, such as regulatory authority or taxation department. The format required by the target system 108 is typically known to the source system 104, and can be included within the document schemas 120.

To differentiate documents that are used internally at the source system 104, but are not sent to the target system 108, interchange document instances 136 are shown. The interchange document instances 136 can be in an interchange format, such as JSON (or more generally, CSN) or XML. However, interchange document instances 136 are not typically limited to a particular format, so long as it is a format that allows for data exchange between the source system 104 and the target system 108.

A document interchange instance 136 can be created in a variety of ways. A document interchange instance 136 can be created directly from an object instance 116. However, often the interchange instance 136 is produced directly from a document instance 124, such as when a "send" or "export" operation is specified.

The target system 108 receives the document interchange instances 136 as interchange document instances 160. Typically, it would be expected that a given document interchange instance 160 would be the same as its corresponding document interchange instance 136. However, transmission or processing errors could cause errors to be introduced.

The target system 108 can operate at least generally as described for the source system 104, although it may have different object and document schemas, or use different applications to interact with data. The internal data structures of the target system 108 are not shown in detail, however, for convenience of presentation.

The target system 108 can process information in the interchange document instances 160 to provide other document instances or object instances 164 (which can be based on corresponding schemas, including in a similar manner as described for the source system 104). At least some of the document (or object) instances 164 can optionally be made available to the source system 104, including by converting them to interchange document instances 168 (which, like the interchange documents instances 136, 160, can be in formats such as JSON or XML).

The source system 104 can receive data from the interchange document instances 160 or from the interchange document instances 168, where they are maintained as target interchange document instances 180.

The data in the target interchange document instances 180 can be used to compare data between the source system 104 and the target system 108 for consistency. For example, target version document instance 184, corresponding to a particular target system interchange instance 160, can be compared with a corresponding interchange document instance 136. Or, data in a target version document instance 184 corresponding to a particular target system interchange document instance 160 can be used to generate one or more target version document instances 184, which can be based on a document schema of the document schemas 120. Optionally, information in a target interchange document object instance 180 corresponding to a particular interchange document instance 168 can be compared with data maintained in document or object instances of the source system 104. The results of comparing documents of the source system 104 and documents based on data received from the target system 108 can be provided as consistency results 188. Further details regarding how consistency results can be determined, and associated with object instances 116, are discussed further with respect to FIG. 4 of Example 5.

One issue that can arise, which will be discussed further as the present disclosure proceeds, is tracking how various object and document instances relate, within the source system 104 or the target system 108, or as between the source system and the target system. In a particular implementation, different representations of an object are provided with a common key, or are linked using a common key. For instance, if the source system 104 and the target system 108 both have document instances that include common information that uniquely identifies a particular document instance or object instance, that information can be used as a common key. Or, if the same information is not included in relevant documents of both the source system 104 and the target system 108, or if it is not desired to define a common key for all documents (or at least for all documents being considered in a particular consistency check), a key for a document instance in the source system can be associated with a common key, and the common key can also be associated with a key for a document instance in the target system.

Figure 2:
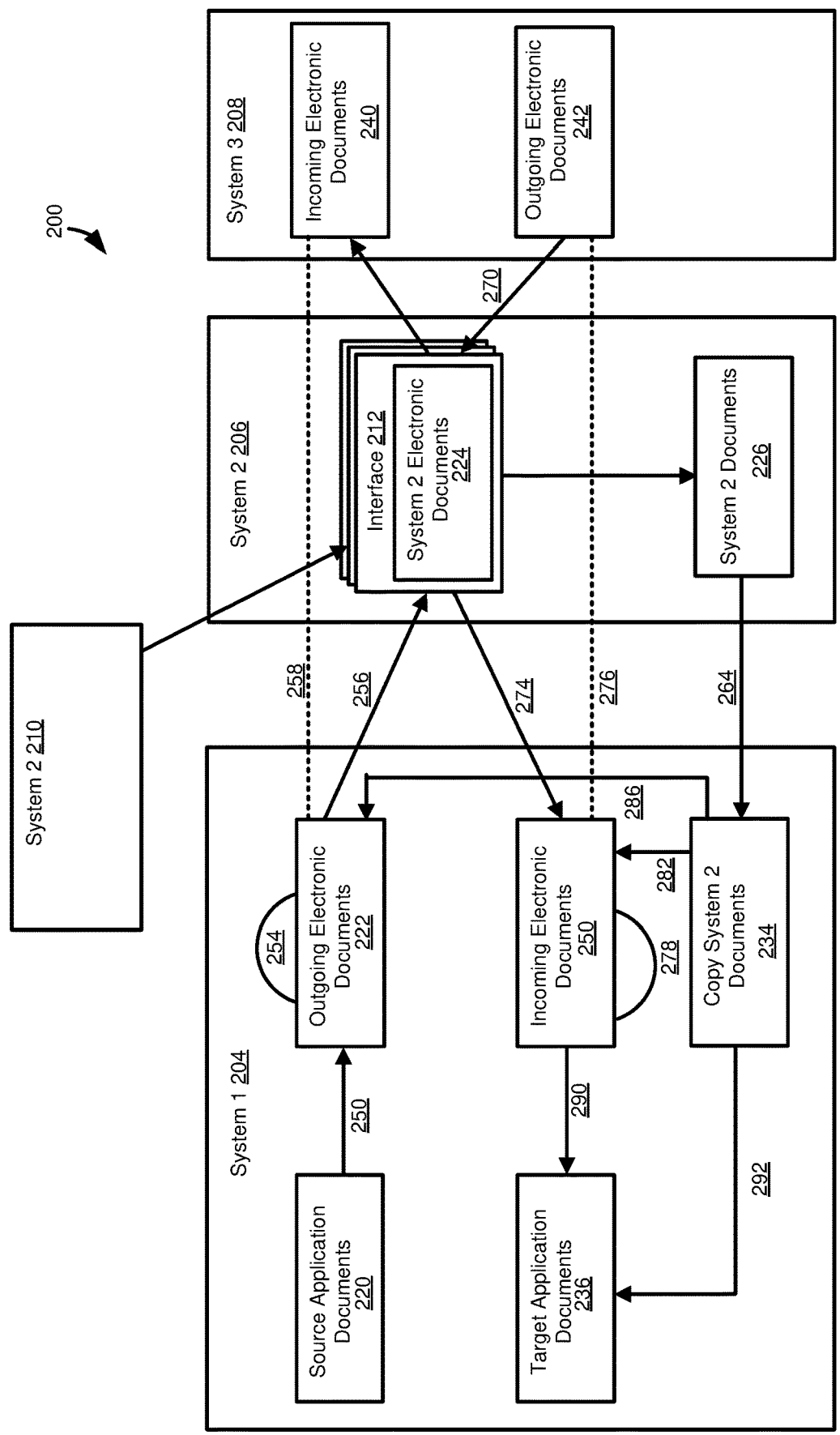
FIG. 2 is a block diagram of a computing environment illustrating consistency checks that can be performed between documents of a first system, a second system, and a third system, or between documents within a given system.

Two examples scenarios are provided illustrating how different documents instances can be sent between computing systems and used in consistency checks:

1.
Outgoing invoice
Billing document
  a) Accounting document
  b) Electronic invoice→send to tax authorities→send to customer
    b1) Consistency check that the electronic document has been created for the invoice
  c) Consistency→retrieve billing information at tax authorities
    c1) Consistency check that tax authorities have invoice
    c2) Consistency check that the invoice exists for the tax authority invoice
2. Incoming electronic invoice from tax authorities
  a) Crete electronic invoice
  b) Create incoming invoice for accounting
    b1) Consistency check that the accounting document exists
    b2) Consistency check that the electronic invoice exists
    b3) Consistency check that accounting data matches electronic invoice data
  c) Consistency→retrieve billing information at tax authorities
    c1) consistency check that electronic invoice exists
    c2) consistency check that purchase order exists
    c3) consistency checks that purchase order matches billing info
    c4) consistency checks that purchase order matches electronic Invoice Example 3—Example Consistency Checks Between Documents at First and Second Systems FIG. 2 illustrates a computing environment 200 that can be a simplified version of the computing environment 100 of FIG. 1. The computing environment 200 includes a first computing system 204, a second computing system 206, a third computing system 208, and a fourth computing system 210. In at least some implementations, the first computing system 204 and the second computing system 206 can correspond, respectively, to the source system 104 and the target system 108 of FIG. 1.

The third computing system 208 can represent another system that sends documents to the second computing system 206, or which can send documents to, or receive document from, the first computing system 204. The fourth computing system 210 can represent another avenue of providing data to the second computing system 206, but where the data is associated with an entity using the first computing system 204. While the fourth computing system 210 is shown as separate from the first computing system 204, in other implementations functionality of the fourth computing system can be integrated into the first computing system. As will be further explained, the fourth computing system 210 can represent an alternative avenue for providing data for the entity using the first computing system 204 to the second computing system 206, and which may be independent of other processes that are used to share data between the first computing system and the second computing system.

In order to help understand disclosed techniques, it may be useful to consider a scenario where the first computing system 204 represents a computing system of a first entity, which in some respects acts as a customer, that purchases items from a second entity, in this case acting as supplier, using the third computing system 208. The second computing system 206 can represent a tax authority. Both the first and second entities may be required to submit documents to the tax authority. The tax authority may wish to confirm that tax records for a transaction between the first and second entities submitted separately by the entities are consistent. The first entity may wish to check that its records are consistent with computing system 206 or computing system 208.

The first entity, through the first computing system 204, and the second entity, through the third computing system 208, can also share documents, directly or indirectly through the second computing system 206. That is, for example, an entity acting as a customer may send a payment directly to an entity acting as a supplier, and the supplier may send an invoice directly to the customer.

Consider that the first entity has one or more software applications that can be used to track financial matters, including the sending of invoices, when the first entity acts as a supplier or seller, the receiving of invoices, when the first entity acts as a customer, and for the submission of tax related documents to the tax authority operating the second computing system 206. Processes may exist for sending documents from the first entity to the tax authority or the second entity, but other information that is associated with the operations of the first entity may be outside of these processes, but may be provided to the tax authority in another manner.

More particularly, the second computing system 206 used by the tax authority can have multiple interfaces 212, including application programming interfaces, for providing data to the tax authority. In general, a number of different communication channels or pathways can exist between a pair of computing systems operated by the first entity, the second entity, or the tax authority. From the point of view of the first entity, the first entity may wish to confirm that data maintained in the first computing system 204 is consistent with data maintained by the second computing system 206 or the third computing system 208.

A source application document 220 can represent a particular document instance 124 of FIG. 1. The source application document 220 can be used to generate an outgoing electronic document 222, which can correspond to an interchange document instance 136 of FIG. 1. The outgoing electronic document 222 is sent to the second computing system 206, where it is stored as a second system electronic document 224.

As a more concrete example, consider that the source application document 220 is a tax filing document prepared by a software application of the first computing system 204, or a record of a paid invoice associated with a transaction between an entity using the first computing system and an entity using the third computing system 208. The outgoing electronic document 222 can represent all or a portion of the data in the source application document 220, formatted in a manner expected by the second computing system 204. The second system electronic document 224 can represent data associated with the outgoing electronic document 222 as received by the second computing system 206. In turn, the second system electronic document 224 can be processed by one or more software applications of the second computing system 206 to product a second system document 226.

Data associated with the second system electronic document 226 can in turn be sent to the first computing system 204, where it is received as copy of a second system document 234 (which can correspond to the target interchange document instances 180 of FIG. 1). The data associated with the copy of the second system document 234 can be used to perform consistency checks with a target application document 236 (which can correspond to the target version documents 184 of FIG. 1). The target application document 236 can be of a same schema as a source application document 220. Since at least two of the documents 220, 234, 236 are based on the same data from a semantic point of view, and may have the same schema, they may be expected to have the same content, or at least content that differs by less than a threshold amount or does not differ in values for particular attributes, but where other differences in other attributes may not influence a decision as to whether the two documents are the "same."

As described above, the second entity operating the third computing system 208 can send documents to, and receive documents from, one or both of the first computing system 204 or the second computing system 206. As shown, the third computing system 208 includes incoming electronic documents 240 that are received from one or both of the first computing system 204 or the second computing system 206. Documents sent from the second computing system 206 can correspond to documents generated by the second computing system, or can represent documents sent from the first computing system 204, including in a scenario where the second computing system forwards to the third computing system 208 an outgoing electronic document 222 of the first computing system.

The third computing system is also shown as including outgoing electronic documents 242, where these documents can be sent to the first computing system 204, where they are received as incoming electronic documents 250. The outgoing electronic documents 242 can be sent from the third computing system 208 to the second computing system 206, where they are received as second system electronic documents 224. The second computing system 206 can send the outgoing electronic documents 242, or outgoing electronic documents generated by the second computing system (in a similar manner as how the outgoing electronic documents 222 can be generated from the source application documents 220), to the first computing system 204, where they are received as incoming electronic documents 250. The incoming document documents 250 can be used to generate a target application document 236.

The fourth computing system 210 can be a source of incoming electronic documents 224 for the second computing system 206. As described above, the fourth computing system 210 can communicate with the second computing system 206 using a different interface 212 than is used for the outgoing electronic documents 222. Second system documents 226 can be produced from these documents received from the fourth computing system 210, and then provided to the first computing system 204 as copies of second system documents 234. Since a source application document 220, or other representation of the data in the copy of the second system document 234 may not exist for the data provided by the fourth computing system 210, disclosed consistency checking techniques can be used to identify missing data at the first computing system 204, which can be a type of data inconsistency.

FIG. 2 illustrates various comparisons that can be performed between the various illustrated documents. As will be seen, the comparisons are between document of the first computing system 204, where the documents being compared can include documents originating from any of the computing systems 204, 206, 208, 210. Comparing documents can include one or more types of comparisons, including comparing whether expected counterpart documents to a given document exist, whether a set of documents have a same semantic status, or whether data maintained in a set of counterpart documents is consistent.

A comparison 250 compares a source application document 220 with an outgoing electronic document 222. The comparison 250 can include one or more of comparing whether a given outgoing electronic document 222 has a corresponding source application document 220, or vice versa, or whether a status or content of the documents is consistent.

A comparison 254 represents comparing an outgoing electronic document 232 with defined process rules. For example, the comparison 254 can include determining whether an outgoing electronic document 222 was sent to the second computing system 206 in a communication 256, including within a defined period (for example, a reporting period or deadline imposed by a tax authority). The comparison 254 can also include determining whether actions with respect to the third computing system 208 have been carried out as required, such as sending an outgoing document 222 to the third computing system in a communication 258 according to a defined process.

Documents 226 of the second computing system 206 can be sent to the first computing system 204 in a communication 264, where they are stored as the copy of second system documents 234. As explained above, it can be desirable to confirm that the first computing system 204 has various documents that correspond to the documents 226 of the second computing system 206, as well as whether such documents have a consistent status or consistent information. Accordingly, a comparison 286 can analyze a document of the copy of the documents received from the second system 234 and an outgoing electric document 222. Although not shown, a similar comparison can be performed between the documents received from the second system 234 and the source application documents 220. The copy of second system documents 234 can include documents of the second computing system 206 that correspond to outgoing electronic documents 242 of the third computing system 208 that were sent to the second computing system in a communication 270, and which were then used to produce a second system document 226.

Incoming electronic documents 250 can be received from the second computing system 206 in a communication 274 or from the third computing system 208 in a communication 276. Incoming electronic documents 250 can be associated with a defined process, and so a comparison 278 can be used to determine whether the incoming electronic documents are consistent with this process, including being received at an expected time or within an expected time interval. For example, after an incoming electronic document 250 is received, the receiving entity may have limited time to take rejection action. Otherwise, a tax authority will consider it as auto-approved. Hence a time bounded check to notify the entity of such potential inactions can be useful.

In some cases, it may be expected that incoming electric document 250 received from the second computing system 206 or the third computing system 208 should be reflected in the copy of second system documents 234, which can be analyzed in a comparison 282. It may also be desirable to confirm whether an outgoing electronic document 222 is consistent with data in the second computing system 206, and so a comparison 286 can be used to compare a copy of a second system document 234 with an outgoing electronic document 222.

It can also be useful to produce application documents, shown as target application documents 236, at the first computing system 204 using information received from another computing system of the computing environment 200. In some case, the documents 236 can be analogous to the source application documents 220, where the difference stems from the source of the data used to generate a document.

FIG. 2 illustrates a comparison 290 between the target application documents 236 and the incoming electronic documents 250, and a comparison 292 between the target application documents and the copy of the second system documents 234. Such comparisons 292 (consistency checks) can be desirable because the target application documents 236 may have been generated based on the incoming electronic documents 250, but may also have been created manually. In the case of manual creation, typing or other data entry mistakes may have occurred, which can be analyzed by the comparisons 292.

The various comparisons in FIG. 2, and disclosed comparisons in general, can be executed using different definitions of documents to be analyzed. In some cases, a particular document or pair of documents can be specified for comparisons of one or more types. In other cases, a larger set of documents can be specified for comparison, such as documents having certain values, including documents that are associated with a particular time period. Even larger sets of documents can be compared, such as comparing all documents satisfying particular consistency check criteria (such as being in a repository and available for checking, and having a suitable document type).

In many scenarios, an entity may have a huge volume of documents. In order to limit data volumes being processed, check processes can be limited to documents that are new or updated, either being new/updated at the first system 204 or at the second system 208. As will be described, an overall set of validations can include validations between subsets of documents within that overall set of validations, and so validations, and their associated consistency checks, only needs to be performed for validations that include the new/updated document, further reducing the volume of data that needs to be processed. Check processes for new or updated documents (object representations) can be performed in a real time manner, in some scenarios. Such dynamic checking can reduce a data volume being processed at any given time, and can also proactively identify or correct inconsistencies. These proactive processes can help limit the time erroneous data exists, and can resolve issues before any legal consequences or other negative effects are encountered.

Example 4—Example Computing Environment Having Consistency Check Framework

Figure 3:
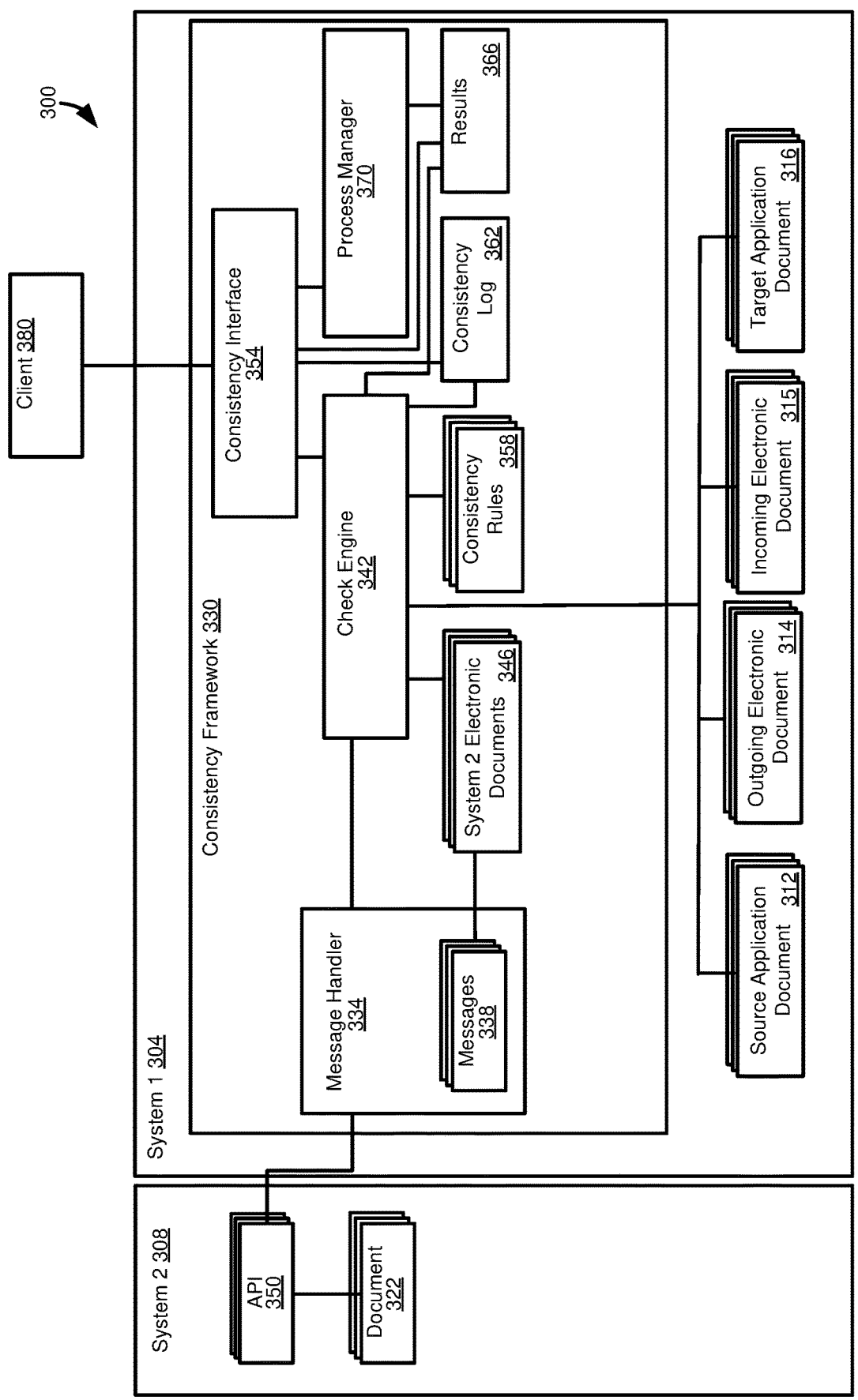
FIG. 3 is a block diagram of a computing environment that can be used to implement disclosed innovations.

The creation and execution of consistency checks for documents, including documents located at different computing systems, can be facilitated using a consistency framework. FIG. 3 illustrates a computing environment 300 that includes a first computing system 304 that is in communication with a second computing system 308. The first computing system 304 can operate a data management solution, such as an enterprise resource and planning software application, which can include software objects at one or more layers to facilitate the operation of an entity. The one or more software layers can include a logical data object layer that accesses objects in a virtual data model, and in turn where at least some objects in the virtual data model refer to objects in a data storage layer, such as data in a relational database system. Examples of suitable software for operating the various layers include those available from SAP SE of Walldorf, Germany, including BusinessObjects (providing logical data objects), CDS views (allowing for virtual data models that interact with BusinessObjects), and HANA (a relational database that can be referenced by CDS views). The software layers are not shown in FIG. 3 for simplicity of presentation.

The first computing system 304, including the ERP or other document generation and management system, includes a plurality of documents 312, 314, 315, 316. The documents 312 and 314 can correspond to the document instances 124 and 136, respectively, of FIG. 1. Further, the documents 312, 314, 315, 316 can correspond to the document instances 220, 222, 250, 236 of FIG. 2. The documents 312, 314, 315, 316 can represent instances of various document types having particular schemas, and can refer to computing objects (including as representations of "core" objects/data collections) having a collection of data. While disclosed techniques can be used for a variety of documents and consistency checks, for explanatory purposes, the first system 304 is shown where the documents 312 are source application documents, the documents 314 are outgoing electronic documents, the documents 315 are incoming electronic document, and the documents 316 are target application documents. The documents 315, 316 can be based on data received from documents 322 of the second system 308, which can be the second system version of an electronic document 220 of FIG. 2.

The first computing system 304 includes a consistency framework 330. The consistency framework 330 facilitates the creation and execution of consistency checks, as well as the storage, retrieval, and visualization of consistency check results. The consistency framework 330 includes, or is in communication with, a message handler 334. The message handler 334 is configured to process inbound messages to the first system 304, such as messages 338 received from the second system 308. Optionally, the message handler 334 also processes at least some outbound messages, such as messages sent by the first system 304 to the second system 308, including outgoing electronic documents 314. The message handler 334 can process additional messages, such as messages sent between the third computing system 208 or the fourth computing system of 210 of FIG. 2.

Messages 338 can be received from the second system 308 in a variety of ways. In some cases, the second system 308 pushes messages to the first system 304, where they are received and at least initially processed by the message handler 334. For example, the message handler 334 can perform actions such as storing the message, or documents associated therewith, as second system electronic documents 346 or sending a notification to another component of the consistency framework 330 that a message 338 has been received, which can initiate a consistency check using a check engine 342. In one implementation, the notification is sent to the check engine 342, the operation of which will be further described below. In other cases, messages 338 are pulled from the second system 308. The message handler 334, or another component of the first system 304, can send a request to the second computing system 308, such as for documents maintained by the second computing system and which are to be used in comparison processes at the first computing system.

The message handler 334 can process messages 338 received in response to push or pull communications. The messages 338 can include document data, but can optionally include other or additional data. When document data is included in a message 338, it can be extracted from the message and made available to the consistency framework 330, such as by storing it as a second system electronic document 346, where it can then be accessible to the check engine 342. Extraction can be particularly useful when a payload of a message 338 includes data for multiple documents. FIG. 3 illustrates the specific example of a second system version of an electronic document 346 being obtained from a message 338. In a particular example, the check engine 342 is triggered after processing of a message 338. This processing the check engine 342 can compare documents received in a message 338 with documents existing in the first system 304 to identify a "delta," where the delta can correspond to documents missing at the first system.

The second system 308 can respond to various requests from the first system 304 in various ways, including through the use of one or more application program interfaces (APIs) 350. In one example, the first system 304 sends a request to an API 350 that includes one or more identifiers for one or more documents to be retrieved from the second system 308, or for particular information about such documents, such as status information. Requests from the first system 304 can be for individual documents, or can be for a set of documents. In some cases, the second system 308 has separate APIs 350 for responding to batch requests or to individual document requests. When the second system 308 pushes information to the first system 304, the message handler 334 can implement an API for such communications, or the first system can include a separate API (not shown) that communicates with the message handler.

The check engine 342 can coordinate and perform consistency check operations. For example, the check engine 342 can initiate a comparison process in response to a message 338 received by the message handler 334, such as using a second system electronic document 346 or an incoming electronic document 315 that corresponds to a second system electronic document 346. Or, the check engine 342 can perform actions, including performing consistency checks in response to a request from a user or user computing process, which can be provided through a consistency interface 354, which is further described below. As part of a response to a request for a consistency check, the check engine 342 can initiate a request for documents from the second system 308, such as using the message handler 334.

As discussed, the check engine 342 can limit comparisons to newly created/obtained documents, or those that have been updated. Thus, the messages 338 can include documents that have not previously been received by the first system 304, or can represent updated versions of documents that were previously received by the first system. In the case of updated documents, a message 338 can include an entire document, which includes the updates, or can include updated values and an identifier of the updated documents, where the updates can then be applied/considered with respect to a previous version of the document available to the first system 304.

The check engine 342 can access consistency rules 358, and operationally perform create, update, or delete functionality for consistency rules (in other cases this can be performed by another component of the first system 304). Consistency rules 358 can be implemented in a variety of ways. In one way, a consistency rule 358 can specify particular document types to which it applies. In the scenario illustrated in FIG. 3, a consistency rule 358 can be specified to compare the second system version of the electronic document 346 with the outgoing electronic document 314, or to compare the second system version of the electronic document 346 with a target application document 316 generated from a corresponding instance of the second system electronic document.

When the consistency rule 358 is called, a particular document identifier can be provided to identify one or both documents to be compared. When a single identifier is provided, the document to be compared can be determined using the identifier, such as by using a key that is common to both documents, including where different keys of the different documents are mapped to a common key. Or, a collection of document identifiers can be provided, or criteria defining documents for a comparison process, such as providing a document type and a date range. More generally, a query can be formulated to identify documents satisfying desired criteria, and identifiers for such documents can be used during the evaluation of a consistency rule 358.

In addition to identifying particular documents, a consistency rule 358 can specify particular checks to be conducted. For example, a consistency rule 358 can specify attributes of the documents to be compared, and optionally criteria that defines when a difference in attribute values results in a finding of inconsistency. For example, a particular calculation process may be performed using different rounding functions or vary somewhat in variables used in conducting a process, such as using more or less precise values, or using a value that is subject to some variability, such as a currency conversion. Or, it could be that other considerations, such as legal or contractual requirements, allow for a certain level of value discrepancy.

An example of a consistency rule 358 is a rule that checks to determine whether two documents have a consistent status (such as relating to a process in which the documents are used, which in turn can represent a status under a particular legal or contractual regime). More generally, a consistency rule 358 can check to see whether two documents are associated with common metadata values, such as a date of submission or a date of receipt.

Other examples of consistency rules 358 are those that consider whether alternative representations of a document exist, or whether one or more documents are missing values for particular data or metadata attributes. That is, for example, one consistency rule 358 can fail if second system version of an electronic document 346 does not exist for a corresponding outgoing electronic document 314 or a source application document 312, while another consistency rule 358 can fail if one document is missing values, or if values for a particular attribute are not in agreement for a pair of documents being analyzed. In some cases, value thresholds, ranges, or other constraints may be specified for particular attributes for a document. In addition to checking for the consistency of two documents, consistency rules 354 can optionally be specified to determine whether a value of a single document satisfies defined criteria (for example, checking to see if a value of a specified attribute does or does not exceed a specified value, or whether values for two attributes have a specified relationship).

In some cases, consistency rules 358 can be reusable. For example, a consistency rule 358 can be implemented as a routine that can be called by another software object, which also can be considered to be a consistency rule. That is, one software object may specify documents to be compared and can specify one or more software objects that implement particular consistency checks. In another example, a consistency rule 358 can be implemented as an object, and can accept parameters that indicate two (or more) documents to be compared using the consistency rule, and optionally values for other parameters (such as a list of attributes to be compared).

As has been discussed, at least certain documents can be associated with process flows, such as when a document should be submitted from the first system 304 to the second system 308 within a defined time period. Consistency rules 358 can check for consistency with such requirements. In some cases, a consistency rule 358 specifies a time period that is calculated based on a date associated with a first document, and data or metadata for a second document is checked to determine whether the second document was submitted within the time period.

A consistency log 362 can be produced (or entries added) in response to the execution/evaluation of the comparison performed by the check engine 342. The consistency log 362 can store information about an overall consistency check process, such as including one or more consistency checks performed for a pair of documents. In a particular example, the consistency log 362 is maintained as a table, such as a relational database table, and has a field representing a consistency check (that is, the overall check process for two document types), a field for a check method of the consistency check and a status indicating whether a given check or check method was performed. So, a table can have multiple entries for a given consistency check if the consistency check has multiple check methods. Status information can include whether the check/check method was performed, but can include further information, such as if the check method completes without errors or with errors. A given entry for the consistency log 362 can include additional information, such as a time a consistency check method was performed, or information about documents that were analyzed during a given execution of a consistency check.

Typically, it is desirable not just to know whether a consistency check was successful or not, but to obtain information about documents that may have failed a consistency check method. This information can be provided as error results 366, which can be maintained in a table or file, or a given error result can be an instance of an abstract or composite data type representing an error result. Error results 366 can be provided on a document-by-document basis for documents failing one or more check methods, and can include information such as one or more document identifiers for documents being compared, an identifier of a check method for the check method that failed, or a time that the test was conducted. Thus, the consistency log 362 can provide general information about an overall check, while the error results 366 can provide details about the source of any failures, which can include details of why a failure occurred. Actions can then be taken to resolve the failures. Note that granular results at least in some cases are maintained when errors are identified, but specific comparison results 366 are not maintained if no errors are found.

At least certain check methods can be associated with one or more remedial actions. A process manager 370 can access the error results 366 to perform such actions.

For example, if a check method determines that the second system 308 does not have a document 322 that corresponds to an outgoing electronic document 314, the remedial action can be to submit the outgoing electronic document to the second system. If a status of a document does not match a status of a document in another system, a notification/alert/change request can automatically be generated and sent to a system which is identified as having incorrect or inconsistent status information. In the example where a document exists at a legal or tax authority, but does not exist at an entity, or in an analogous situation, a remedial measure can be to create a document at the entity system, such as creating an application document from an electronic document received from the legal/tax authority or from the third computing system 208. If an inconsistency is identified in that an expected/required action has not been taken, the action can be automatically initiated.

In other cases, inconsistencies may not be suitable for automatic remediation, but an alert can be generated to a user or user process to call out the inconsistency for remedial action by a user/external process. Remedial actions to be taken can be specified in various ways, but in one particular implementation a remedial action can be specified in a consistency rule (for example, IF testfailed THEN execute_remedial_actiono).

Example 5—Example Consistency Objects

Figure 4:
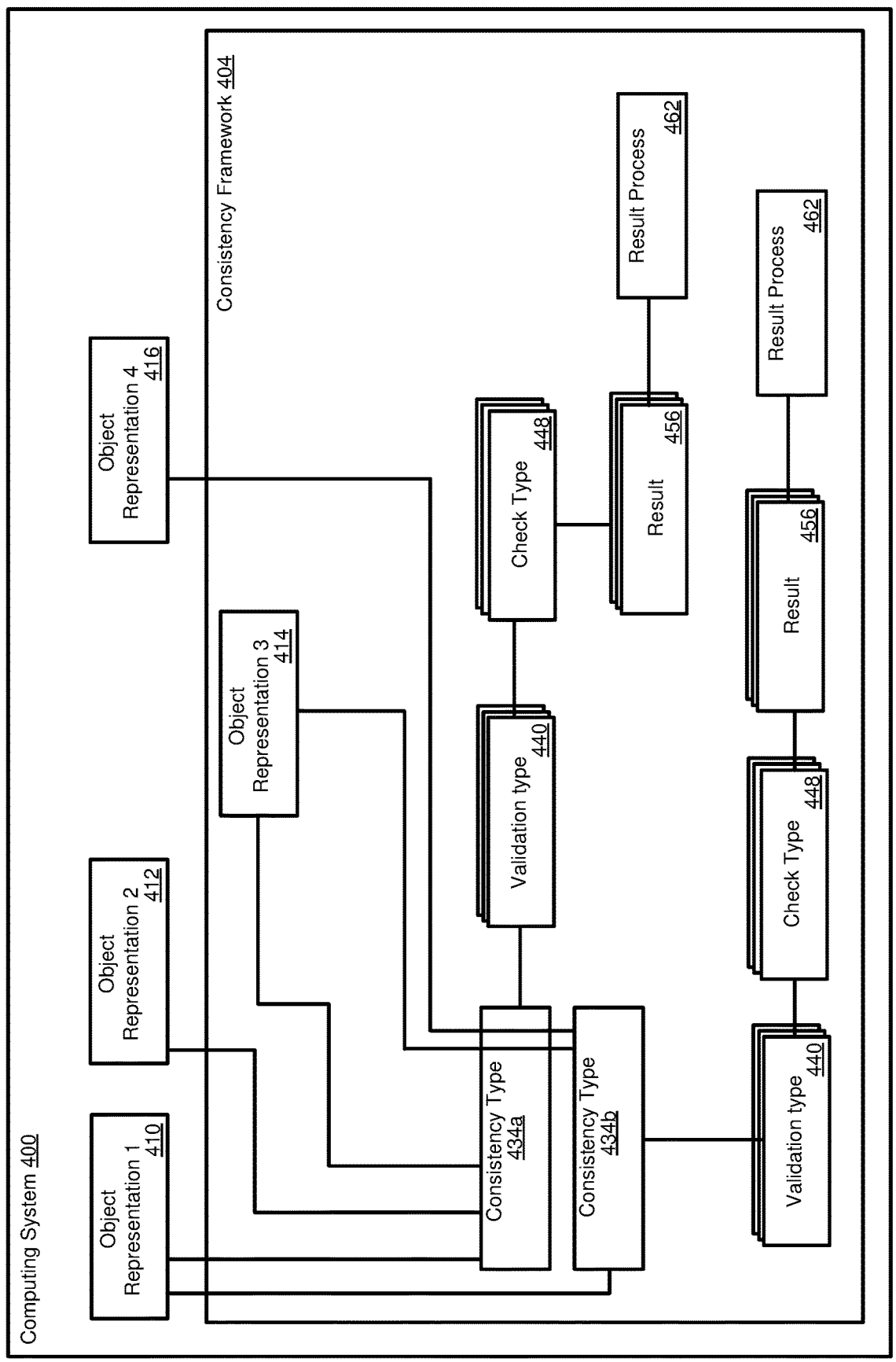
FIG. 4 is a diagram illustrating consistency objects that can be used in disclosed techniques.

FIG. 4 illustrates how consistency operations can be defined, including a collection of one or more object representations that are subject to one or more validations, where a given validation can include one or more consistency checks that produce consistency results, and where a result process for a consistency check/consistency result can be used, at least in some cases, to automatically address errors or issues that were identified in the consistency results.

FIG. 4 illustrates a computing system 400 that includes a consistency framework 404, where the computing system can be the computing system 304 and the consistency framework can be the consistency framework 330 of FIG. 3. The computing system 400 includes a plurality of representations 410, 412, 414, 416 of a particular object. For simplicity of presentation, representations of a single object are shown, and these may be only a portion of available representations for the object, and particular consistency objects (where the consistency objects can include objects representing consistency type, validation type, consistency check, result, and result process, as will be further described) used with the object and its associated representations. In practice, the computing system 400 will typically be used with multiple objects, and their representations, and the consistency objects can be implemented in an analogous manner as described for the objects depicted in FIG. 4.

The object representations are used by a plurality of consistency type objects 434, shown as 434a and 434b. Although two consistency type objects 434 are shown, more than two consistency type objects could be present, or one or more object representations 410, 412, 414, 416 can be associated with only a single consistency type object for a given object. A consistency type object 434 can collect a plurality of object representations 410, 412, 414, 416 to use in a specific consistency scenario, such as defined for a particular purpose of a particular entity. It may be desired to perform consistency checking for representations of a single object for multiple purposes, where each purpose can be represented as a consistency type object 434.

Note that a given object representation 410, 412, 414, 416 can be used in a single consistency type object 434 or can be used in multiple consistency type objects. As shown, consistency type object 434a uses object representations 410, 412, 414, while consistency type object 434b uses object representations 410, 414, 416.

A given consistency type object 434 can be associated with one or more validation type objects 440. Validation type objects 440 can define a subset of object representations 410, 412, 414, 416 of a consistency check object 434 to be evaluated for validity. A given validation type object 440 can be specific to a particular consistency type object 434, although, substantively, validation type objects can be similar between consistency type objects. In some cases, a validation type object 440 can define a pair of objects representations 410, 412, 414, 416 to be compared. While a single validation type object 440 can exist for a given set (such as a pair) of object representations 410, 412, 414, 416, in other cases the same set of object representations can be used with multiple validation type objects 440, such if the set of documents is to be checked for different purposes.

A given validation type object 440 can in turn be associated one or more check type 448. A consistency check 448 can represent a function or similar computing process to compare two or more object representations 410, 412, 414, 416, or to compare one or more object representations with a set of rules or criteria. For example, a single object representation 410, 412, 414, 416 can be compared with rules defining times at which various actions with respect to the object representations should be taken. Other examples of check type 448 can include determining whether a status (such as a release or payment status) of two or more object representations 410, 412, 414, 416 is consistent, or whether content of two or more object representations is consistent.

A given check type 448 produces a result 456. A result 456 can include information such as whether a given check type 448 passed or failed. In a particular implementation, only failures results may be of interest, and so in those cases a result 456 is only produced if a check type 448 failed. A result 456 can include information regarding why a consistency check passed 448 or failed. For example, if two object representations 410, 412, 414, 416 are expected to have a common value for a particular attribute, a result 456 can indicate the different values associated with the attribute for the object representations being compared.

In turn, a given result 456 can be associated with a result process 462. A result process 462 can represent an action to be automatically taken when a result 456 indicates an inconsistency or invalidity. For example, if a result 456 indicates that an object representation 410, 412, 414, 416 is expected to exist, such as based on the existence of a related object representation, but such object is not found, the object representation can be created as part of a result process 462. Similarly, a result 456 can indicate that an object representation 410, 412, 414, 416 was not sent to another computing system, and so a corresponding result process 462 can include sending an appropriate object representation to such computing system. Other types of result processes can include adjusting attribute values of one or more object representations 410, 412, 414, 416, such as of those used in the corresponding validity type object 440, such that the values of two or more of the object representation are consistent.

Results 456 can be used in additional ways. For example, results 456 can be stored, and then retrieved and displayed, or otherwise processed, upon request. Or, consistency or validity issues can be called to the attention of a user using the results 456.

Example 6—Example Implementation Techniques for Documents, Consistency Checks, and Consistency Check Results As discussed, a comparison of documents posits that one or more documents related/corresponding to another document can be identified. In one aspect, the present disclosure uses a common identifier to associate documents for comparison purposes.

Figure 5:
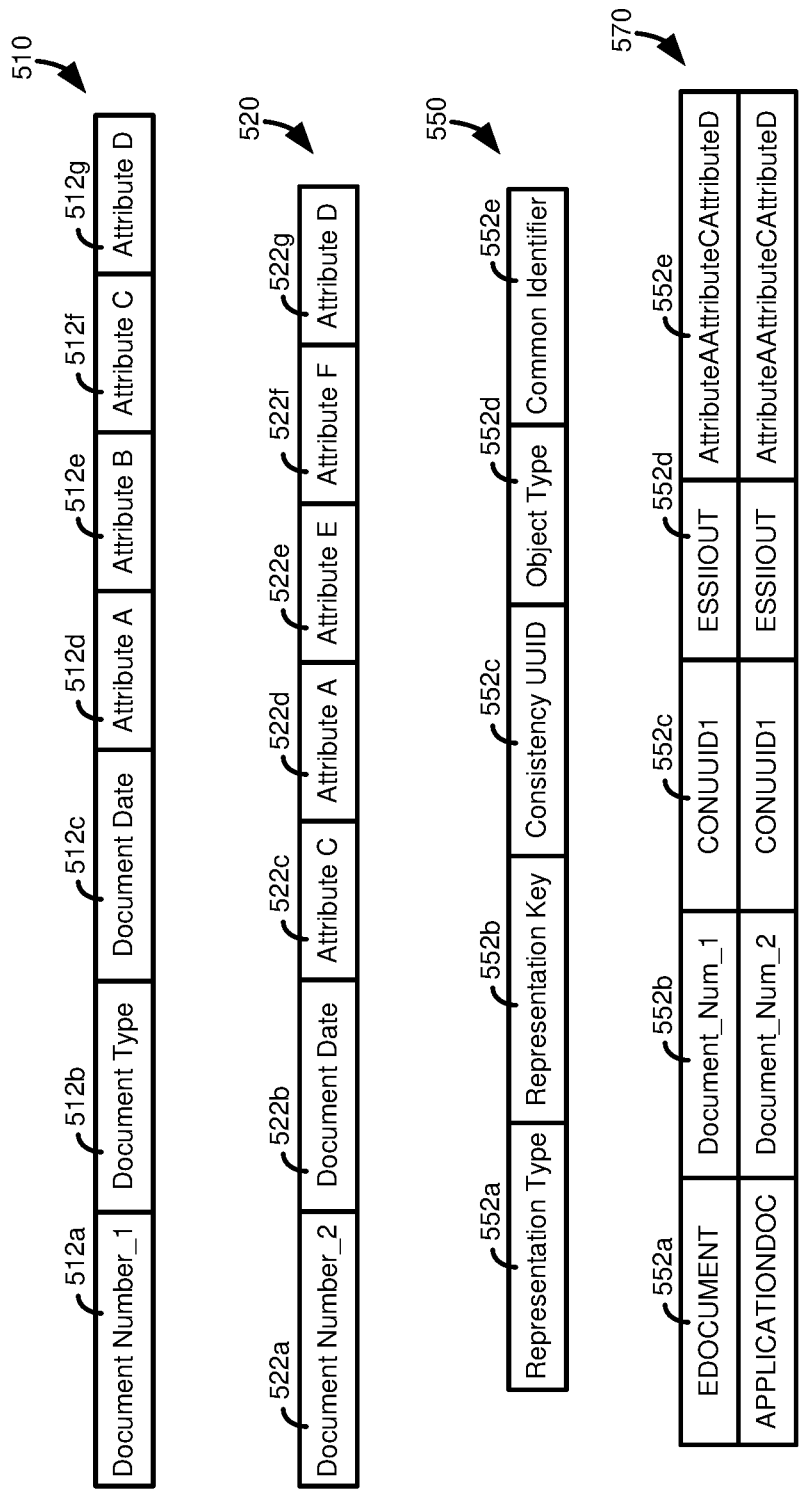
FIG. 5 illustrates example information that can be maintained for documents, and how documents can be associated using a common identifier.

FIG. 5 illustrates tables 510, 520 having respective attributes 512 (shown as 512a-512g) and attributes 522 (shown as 522a-522g) for two different, but "related" documents. Information for particular documents can be stored in rows of tables having a schema defined by a table 510, 520, or data for documents can be stored in another manner. For example, data for a document can be stored in a file organized such that data corresponding to the attributes 512, 522 can be identified/extracted, or the attributes 512, 522 can correspond to member variables of an abstract or composite data type representing a particular document type.

The tables 510, 520 are shown with attributes 512a, 522a that provide a document identifier for a particular document having a type defined by a schema of a respective table 510, 520. In some cases, the document identifiers can be the same for documents that can be considered as "related representations" or which are otherwise to be compared, while in other cases, and perhaps more typically, the document identifiers are different. In particular, document identifiers that are unrelated to semantic data of a document can be arbitrarily assigned, and therefore may be more likely to differ if the documents are maintained on different systems. If tables 510, 520 have a common document identifier for related documents, then the attributes 512a, 522a can serve as a common identifier that can be used to identify pairs of documents to be compared.

In some cases, a table (or other collection of document attributes) can include other attributes that may not be semantically related to a particular instance of the associated document type. For example, table 510 is shown having an attribute 512b that identifies a document type of the document.

The tables 510, 520 include attributes 512, 522 that are specific to particular instances of the document type, where some attributes can be the same between the different document types represented by the tables and where other attributes can be different. In addition, even for attributes that are the same between the tables 510, 520, the values can be different (similar to the document identifiers). For example, both tables 510 and 520 include an attribute for a document date, attributes 512c and 522b, respectively. In some cases, the document dates may be the same, such as when the documents represent an electronic document sent from one entity to another and the corresponding document as received by the receiving entity. Or, the dates may be independent of sending/receipt, such as when the document date represents an invoice date.

Each of the tables 510, 520 are shown with a variety of additional attributes, 512d-512g and 522c-522g, that are specific to particular instances of a document type. Some of the attributes can be the same between the document types, or the attributes can differ, either by having attributes with different "meanings," or by having attributes with the same at least general meaning, but having different values.

In the case where the tables 510, 520 have particular attributes in common, and where common values would be expected for common attributes, one or more of these attributes can serve as a "key" that allows both a document of the type represented by the table 510 to be identified, as well as a corresponding document of the table 520. In some cases, a given document type may have multiple keys, but fewer keys, including a single key or no keys, may be common between different document types. In the case where documents are received from another system, received information may be more limited, and it may be desirable to use attributes in the received document as the basis for a common key with a document type of a receiving system.

For some document types, there may not be a single attribute or a collection of attributes that is common between document types and uniquely identifies corresponding documents. In this case, a common identifier can be created, and the separate keys mapped to the common identifier, or a key from one document can be directly mapped to another document, including to the key of another document.

Table 550 represents a schema that can be used to associate object representations with a consistency type, such as the consistency type object of FIG. 4. An attribute 552a identifies a type for a particular object representation. An attribute 552c identifies a particular consistency object (for example, using a universally unique identifier for a particular consistency object). An attribute 552d identifies a consistency type for the row. An attribute 552b identifies the particular object representation using its key (or other identifier), while an attribute 552e provides a common identifier that can be used to associate at least certain object representations.

Table 570 provides example values for the attributes of the table 500. In particular, note that the common attribute indicated for the field 552e is a concatenation of attributes that appear in both table 510 and table 520.

FIG. 6 illustrates example comparison results, in a table 600, from an example consistency check of two documents, document A and document B. A column 610 provides a value for a consistency type. As has been described, a consistency type object can have multiple validation type objects, and a given validation type object can include multiple checks, and a given row of the table 600 can include attributes illustrating results for the different check methods. For each check method, a cell 614 identifies that check method, and cells 618, 620 provide the values for a pair of documents being compared. In some cases, multiple comparisons can be performed by a single check method (such as comparing different pairs of attributes between two documents), and so the cells 614 can alternatively represent particular check results of particular check methods.

In the table 600, various values are compared, including a number of records associated with each document, and various values, such as aggregated values, reflected in the documents. Thus, visual inspection of the table 600, or a computer-implemented query, can identify values that do or do not match between the documents. However, if the table 600, or a similar data presentation, is displayed to a user, the table can optionally include status identifiers 628 to help a user interpret the results. For example, it could be that values between two documents differ, but that the difference is within acceptable tolerances, and no consistency violation is found. FIG. 6 illustrates identifier values 628 that indicate a consistency violation (exclamation point), a discrepancy that does not produce a consistency violation (square), and values having no discrepancy (circle).

FIG. 7 illustrates example constancy rules (such as the consistency rules 358 of FIG. 3) in the form of tables 700 and 750, which can be implementations of the check type 448 of FIG. 4. Each table 700, 750 includes attributes 710a-710g, which can represent a schema for consistency checks, and where different values for these attributes present in columns 720, 760 define particular consistency check instances according to such schema.

The attribute 710a identifies a validity type, which can represent a validation type object 440 of FIG. 4. Note that the values for the attribute 710a in columns 720, 760 are the same, indicating that the consistency checks of the tables 700, 740 are for the same validation type object.

Attribute 710b provides a name for a given consistency check, such as for display to a user, while attribute 710c provides a numeric identifier for the consistency check. As discussed above, at least some validation type objects 440 can representation comparisons between a set of object representations. Attributes 710d, 710e can indicate particular data for two object representations being compared. Table 700 represents an existence check, and so the values for the attributes 710d, 710e provided in the column 720 indicate that two documents (which can be particular object representations) are being compared. Table 750 represents a status check, and so the values for the attributes 710d, 710e specify particular fields of the particular documents being compared, where the fields contain the status information to be compared.

Identities of particular check methods to be used can be provided as values for attribute 710f. Results can be associated with a result process, and the result process can be indicated using values for attribute 710g. In some cases, a result type indicated by a value for the attribute 710f can identify a particular computing object type to be used in storing result data, and an instance of this object can be created when the check method identified by the attribute 710f is called as part of executing a consistency check definition 700, 750.

Example 7—Example Consistency Check Operations

Figure 8:
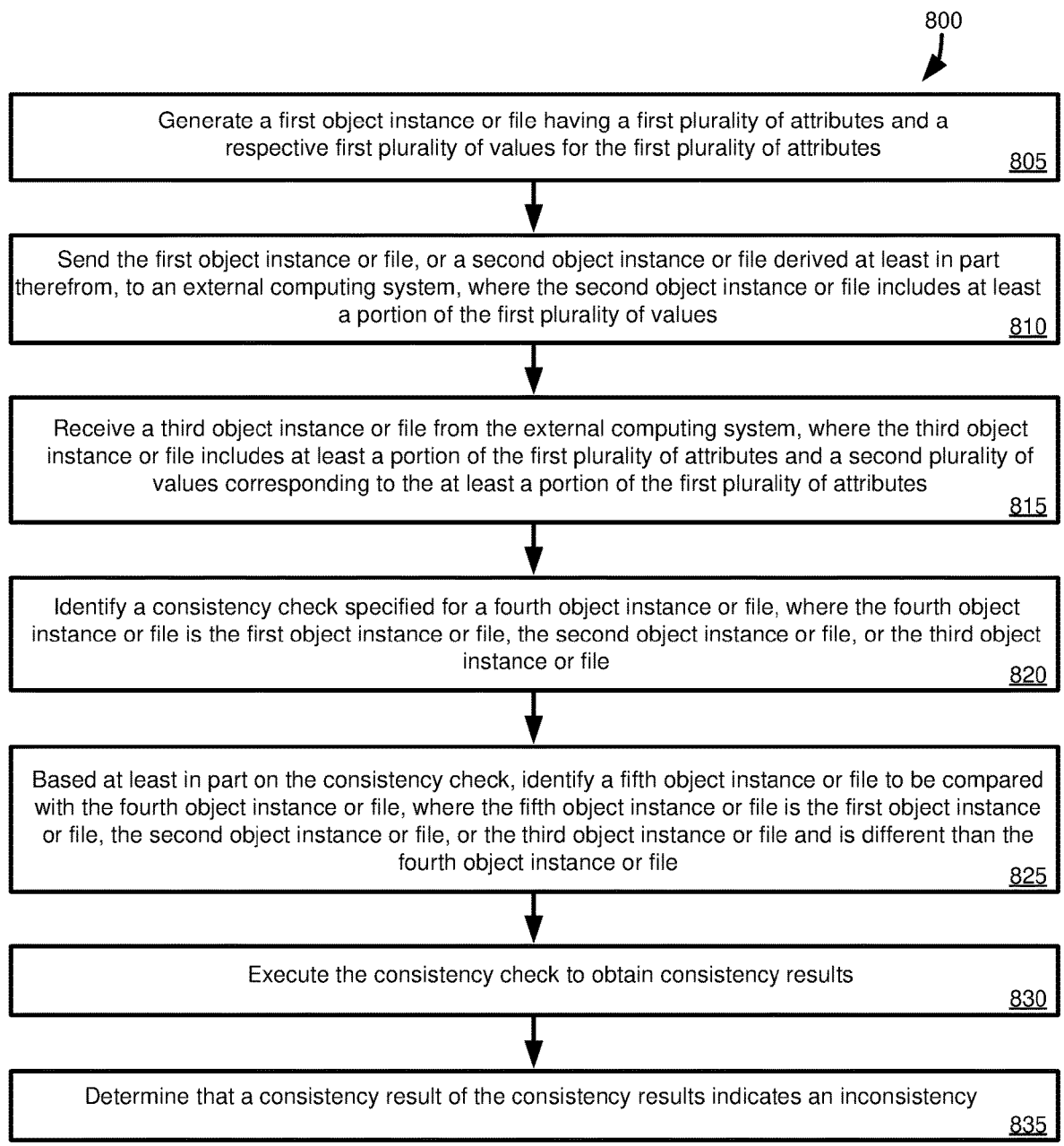
FIG. 8 is a flowchart of an example technique for determining an inconsistency between at least two objects or files.

FIG. 8 is a flowchart of an example process 800 for determining an inconsistency between at least two objects or files, and automatically taking a remedial action to address the inconsistency. The process 800 can be performed in the computing environment 300 of FIG. 3, and can use consistency types and check types as described with respect to FIG. 4.

A first object instance or file having a first plurality of attributes and a respective first plurality of values for the first plurality of attributes is generated at 805. At 810, the first object instance or file, or a second object instance or file derived at least in part therefrom, is sent to an external computing system, where the second object instance or file includes at least a portion of the first plurality of values. A third object instance or file is received at 815 from the external computing system, where the third object instance or file includes at least a portion of the first plurality of attributes and a second plurality of values corresponding to the at least a portion of the first plurality of attributes. The third object instance or file can be, in some implementations, a representation of data in the first object instance or file or the second object instance or file.

At 820, a consistency check specified for a fourth object instance or file is identified, where the fourth object instance or file is the first object instance or file, the second object instance or file, or the third object instance or file. Based at least in part on the consistency check, at 825, a fifth object instance or file to be compared with the fourth object instance or file is identified, where the fifth object instance or file is the first object instance or file, the second object instance or file, or the third object instance or file and is different than the fourth object instance or file.

The consistency check is executed at 830 to obtain consistency results. At 835, it is determined that a consistency result of the consistency results indicates an inconsistency. Optionally, the process 800 include, in response to the determining that a consistency result of the consistency results indicates an inconsistency, automatically taking a remedial action to address the inconsistency. Further, the process 800 can include persisting the consistency results.

Example 8—Computing Systems

Figure 9:
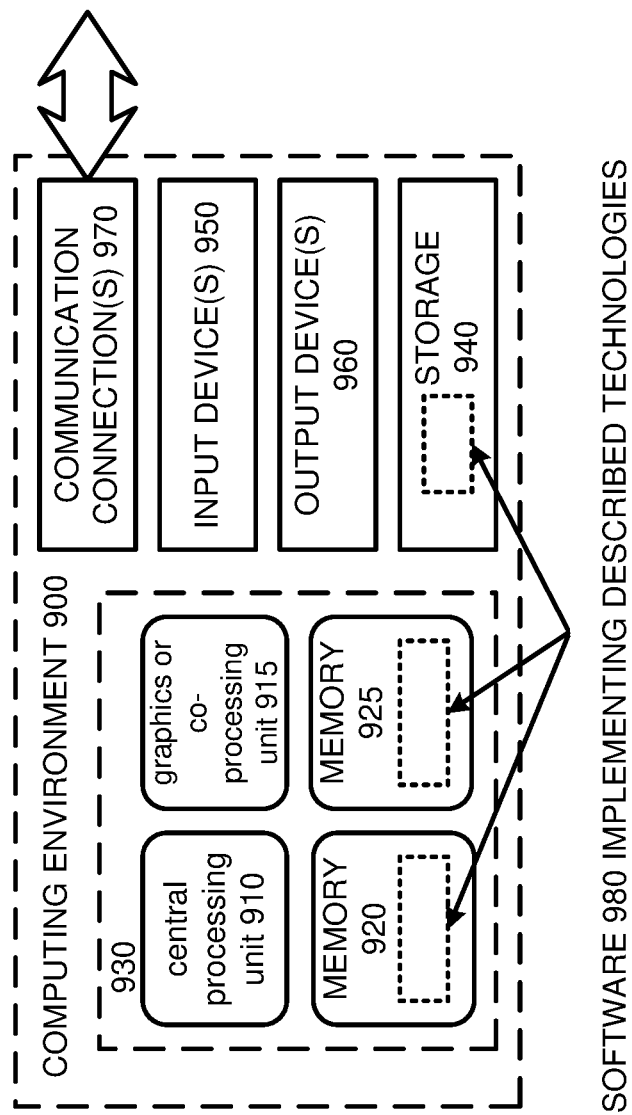
FIG. 9 is a diagram of an example computing system in which some described embodiments can be implemented.

FIG. 9 depicts a generalized example of a suitable computing system 900 in which the described innovations may be implemented. The computing system 900 is not intended to suggest any limitation as to scope of use or functionality of the present disclosure, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing components of the computing architecture 100 of FIG. 1, including as described in Examples 1-7. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way, and which can be accessed within the computing system 900.

The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9—Cloud Computing Environment

Figure 10:
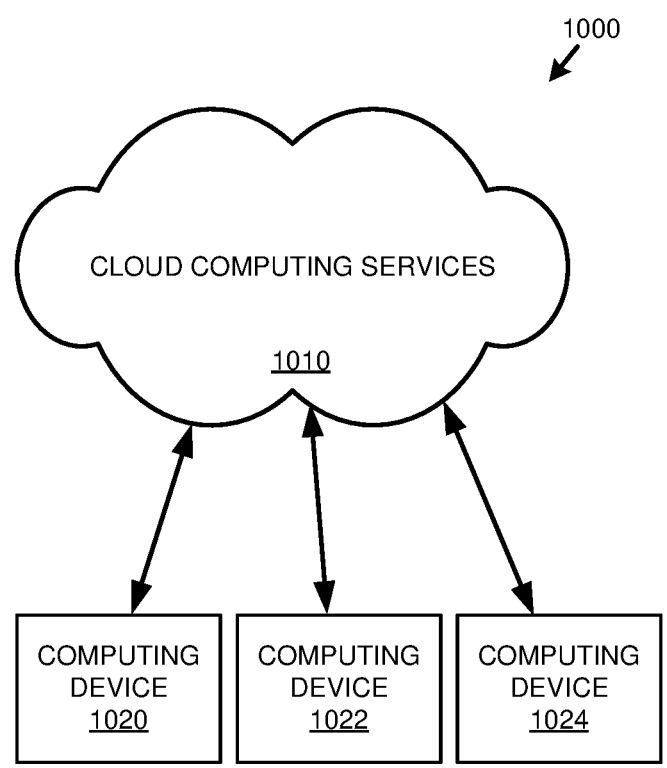
FIG. 10 is an example cloud computing environment that can be used in conjunction with the technologies described herein.

FIG. 10 depicts an example cloud computing environment 1000 in which the described technologies can be implemented. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operators (e.g., data processing, data storage, and the like).

Example 10—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C, C++, C #, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one memory;
one or more hardware processing units coupled to the at least one memory; and
one or more computer readable storage media storing computer-executable instructions that, when executed, cause the computing system to perform operations comprising:
generating a first object instance or file having a first plurality of attributes and a respective first plurality of values for those attributes;
sending the first object instance or file, or a second object instance or file derived at least in part therefrom, to an external computing system, wherein the second object instance or file comprises at least a portion of the first plurality of values;
receiving a third object instance or file from the external computing system, wherein the third object instance or file comprises at least a portion of the first plurality of attributes and a second plurality of values corresponding to the at least a portion of the first plurality of attributes, the second plurality of values having been produced by processing the second object instance or file by the external computing system;
identifying a consistency check specified for a fourth object instance or file, wherein the fourth object instance or file is the first object instance or file, the second object instance or file, or the third object instance or file;
based at least in part on the consistency check, identifying a fifth object instance or file to be compared with the fourth object instance or file, wherein the fifth object instance or file is the first object instance or file, the second object instance or file, or the third object instance or file and is different than the fourth object instance or file and one of the fourth object instance or file or the fifth object instance or file comprises values of the second plurality of values for multiple attributes of the third object instance or file received from the external computing system; and
executing the consistency check to obtain consistency results, wherein executing the consistency check compares values of the multiple attributes with values of the first plurality of values for attributes corresponding to the multiple attributes.

2. The computing system of claim 1, where the consistency check specifies one or more consistency check methods.

3. The computing system of claim 1, wherein the fourth object instance or file has a first status and the fifth object instance or file has a second status, the operations further comprising:
comparing the first status and the second status.

4. The computing system of claim 1, the operations further comprising:
comparing a value of a first attribute of the first plurality of attributes of the fourth object instance or file with a value of the first attribute as represented in the fifth object instance or file.

5. The computing system of claim 1, the operations further comprising:
as part of the consistency check, comparing a value of a first attribute of the first plurality of attributes of the fourth object instance or file or a value of the first attribute as represented in the fifth object instance or file with defined criteria.

6. The computing system of claim 1, the operations further comprising:
as part of the consistency check, determining that the value of a first attribute of the first plurality of attributes of the fourth object instance or file and the value of the first attribute as represented in the fifth object instance or file are not equal; and
logging an inconsistency result.

7. The computing system of claim 1, the operations further comprising:
as part of the consistency check, determining that the value of a first attribute of the first plurality of attributes of the fourth object instance or file and the value of the first attribute as represented in the fifth object instance or file exceed a threshold difference; and
logging an inconsistency result.

8. The computing system of claim 1, the operations further comprising:
receiving a sixth object instance or file from the external computing system; and
as part of a consistency check for the sixth object instance or file, determining that the computing system does not have a specified object instance or file corresponding to the sixth object instance or file.

9. The computing system of claim 1, the operations further comprising:

as part of a consistency check for a sixth object instance or file of the computing system, determining that the external computing system does not have a specified object instance or file corresponding to the sixth object instance or file.

10. The computing system of claim 1, the operations further comprising:
as part of a consistency check for the first object instance or file, determining that the second object instance or file does not exist.

11. The computing system of claim 1, the operations further comprising:
as part of a consistency check for a sixth object instance or file, wherein the sixth object instance or file is the first object instance or file, the third object instance or file, or is an object instance or file other than the first object instance or file or the third object instance or file, determining that a deadline associated with the sixth object instance or file is upcoming or passed; and
taking or recommending a remedial action in response to the determining that a deadline associated with the sixth object instance or file is upcoming or passed.

12. The computing system of claim 1, wherein the first object instance or file and the third object instance or file have a common identifier.

13. The computing system of claim 1, the operations further comprising
determining that a consistency result of the consistency results indicates an inconsistency; and
in response to the determining that a consistency result of the consistency results indicates an inconsistency, automatically taking a remedial action to address the inconsistency.

14. The computing system of claim 13, wherein the remedial action is specified in a definition of a consistency check.

15. The computing system of claim 1, wherein the first object instance or file and the third object instance or file comprise a subset of attributes and corresponding attributes values of a sixth object instance.

16. The computing system of claim 1, wherein the third object instance or file is received in response to a push operation initiated by the external computing system.

17. The computing system of claim 1, wherein the third object instance or file is received in response to a pull operation initiated by the computing system.

18. The computing system of claim 1, wherein the third object instance or file is received in a communication from the external computing system comprising a plurality of object instances or files.

19. A method, implemented in a computing system comprising at least one hardware processor and at least one memory coupled to the at least one hardware processor, the method comprising:
by a sending computing system, generating a first object instance or file having a first plurality of attributes and a respective first plurality of values for those attributes;
by the sending computing system, sending the first object instance or file, or a second object instance or file derived at least in part therefrom, to an external computing system, wherein the second object instance or file comprises at least a portion of the first plurality of values;
by the sending computing system, receiving a third object instance or file from the external computing system, wherein the third object instance or file comprises at least a portion of the first plurality of attributes and a second plurality of values corresponding to the at least a portion of the first plurality of attributes, the second plurality of values having been produced by processing the second object instance or file by a computing system other than the sending computing system;
by the sending computing system, identifying a consistency check specified for a fourth object instance or file, wherein the fourth object instance or file is the first object instance or file, the second object instance or file, or the third object instance or file;
by the sending computing system, based at least in part on the consistency check, identifying a fifth object instance or file to be compared with the fourth object instance or file, wherein the fifth object instance or file is the first object instance or file, the second object instance or file, or the third object instance or file and is different than the fourth object instance or file and one of the fourth object instance or file or the fifth object instance or file comprises values of the second plurality of values for multiple attributes of the third object instance or file received from the external computing system;
by the sending computing system, executing the consistency check to obtain consistency results, wherein executing the consistency check compares values of the multiple attributes with values of the first plurality of values for attributes corresponding to the multiple attributes; and
by the sending computing system, logging the execution of the consistency check or storing the consistency results.

20. One or more computer-readable storage media comprising:
computer-executable instructions that, when executed by a computing system comprising at least one hardware processor and at least one memory coupled to the at least one hardware processor, cause the computing system to generate a first object instance or file having a first plurality of attributes and a respective first plurality of values for the those attributes;
computer-executable instructions that, when executed by the computing system, cause the computing system to send the first object instance, or file or a second object instance or file derived at least in part therefrom, to an external computing system, wherein the second object instance or file comprises at least a portion of the first plurality of values;
computer-executable instructions that, when executed by the computing system, cause the computing system to receive a third object instance or file from the external computing system, wherein the third object instance or file comprises at least a portion of the first plurality of attributes and a second plurality of values corresponding to the at least a portion of the first plurality of attributes, the second plurality of values having been produced by processing the second object instance or file by the external computing system;
computer-executable instructions that, when executed by the computing system, cause the computing system to identify a consistency check specified for a fourth object instance or file, wherein the fourth object instance or file is the first object instance or file, the second object instance or file, or the third object instance or file;
computer-executable instructions that, when executed by the computing system, cause the computing system to, based at least in part on the consistency check, identify a fifth object instance or file to be compared with the fourth object instance or file, wherein the fifth object instance or file is the first object instance or file, the second object instance or file, or the third object instance or file and is different than the fourth object instance or file and one of the fourth object instance or file or the fifth object instance or file comprises values of the second plurality of values for multiple attributes of the third object instance or file received from the external computing system;

computer-executable instructions that, when executed by the computing system, cause the computing system to execute the consistency check to obtain consistency results, wherein executing the consistency check compares values of the multiple attributes with values of the first plurality of values for attributes corresponding to the multiple attributes; and computer-executable instructions that, when executed by the computing system, cause the computing system to log the execution of the consistency check or to store the consistency results.

\* \* \* \* \*